United States Patent [19]

Rogers

[11] Patent Number: 5,258,774
[45] Date of Patent: Nov. 2, 1993

[54] COMPENSATION FOR AERODYNAMIC INFLUENCES IN INK JET APPARATUSES HAVING INK JET CHAMBERS UTILIZING A PLURALITY OF ORIFICES

[75] Inventor: Robert L. Rogers, Sandy Hook, Conn.

[73] Assignee: Dataproducts Corporation, Woodland Hills, Calif.

[21] Appl. No.: 837,557

[22] Filed: Feb. 14, 1992

Related U.S. Application Data

[63] Continuation of Ser. No. 516,442, Apr. 30, 1990, abandoned, which is a continuation of Ser. No. 252,062, Sep. 30, 1988, abandoned, which is a continuation-in-part of Ser. No. 236,327, Aug. 22, 1988, Pat. No. 4,901,093, which is a continuation of Ser. No. 89,020, Aug. 24, 1987, abandoned, which is a continuation of Ser. No. 801,926, Nov. 26, 1985, abandoned.

[51] Int. Cl.$^5$ .............................................. B41J 2/045
[52] U.S. Cl. ................................... 346/1.1; 346/140 R
[58] Field of Search ........................... 346/140 R, 1.1

[56] References Cited

U.S. PATENT DOCUMENTS

| | | | |
|---|---|---|---|
| 3,714,928 | 2/1973 | Taylor | 346/75 X |
| 4,131,899 | 12/1978 | Christou | 346/140 |
| 4,367,480 | 1/1983 | Kotoh | 346/140 |
| 4,459,601 | 7/1984 | Howkins | 346/140 |
| 4,485,386 | 11/1984 | Dagna | 346/140 X |
| 4,567,570 | 1/1986 | Peer | 364/519 X |
| 4,714,934 | 12/1987 | Rogers | 346/140 |
| 4,901,093 | 2/1990 | Ruggiero | 346/140 |

Primary Examiner—Joseph W. Hartary
Attorney, Agent, or Firm—Woodcock Washburn Kurtz Mackiewicz & Norris

[57] ABSTRACT

Impulse ink jet apparatus has a plurality of side-by-side chambers extending along a line that is slanted with respect to a direction of scanning relative to a recording medium. Each of the chambers includes a plurality of orifices that are arranged along a line extending substantially transverse to the scanning direction and a transducer for ejecting a plurality of droplets from the orifices of each chamber. The orifices are formed upon an orifice plate such that the distance between the centers of adjacent orifices associated with a single chamber are separated by a predetermined distance greater than the center distance required for drop placement on the recording medium.

9 Claims, 5 Drawing Sheets

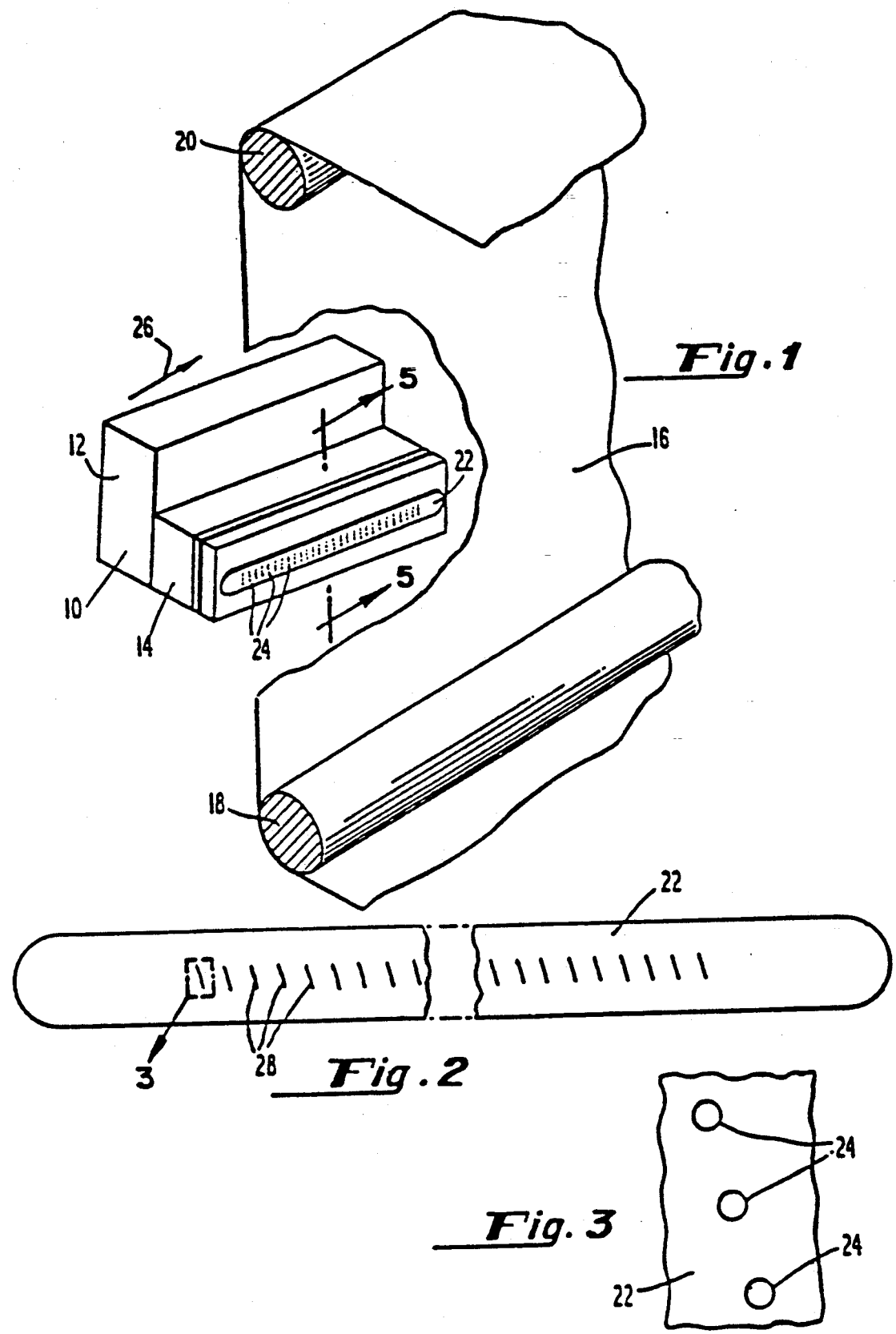

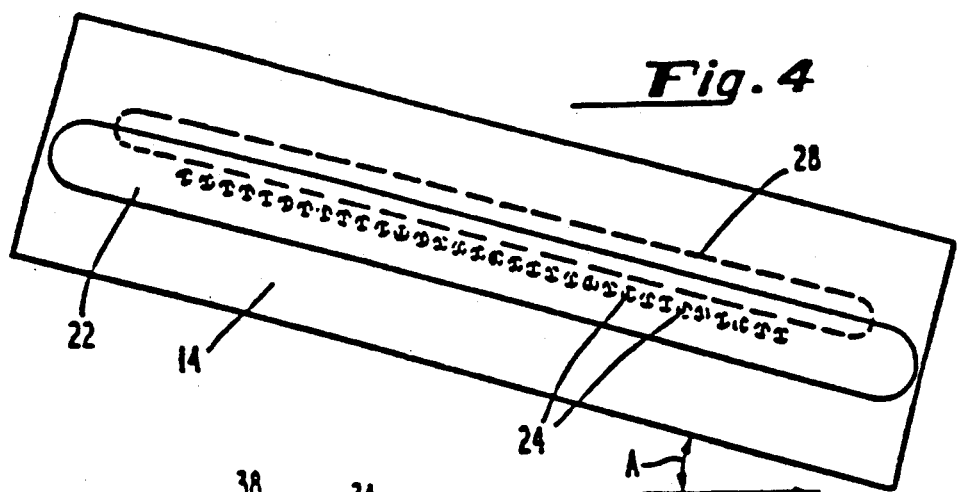
Fig. 4
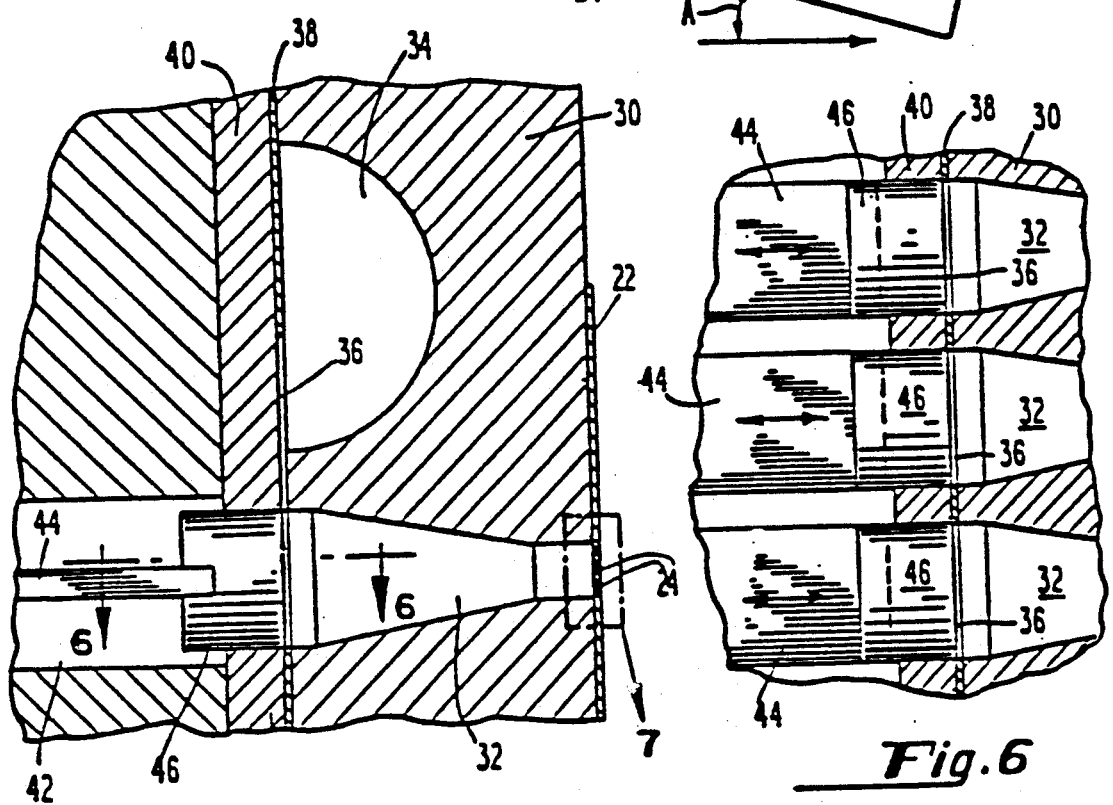
Fig. 5
Fig. 6
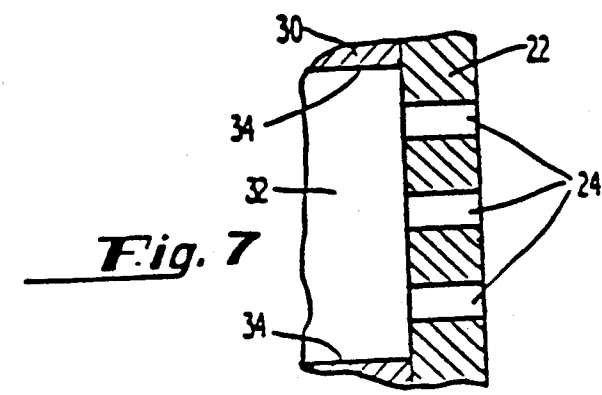
Fig. 7

COMPENSATION FOR AERODYNAMIC INFLUENCES IN INK JET APPARATUSES HAVING INK JET CHAMBERS UTILIZING A PLURALITY OF ORIFICES

This is a continuation of application Ser. No. 516,442, filed Apr. 30, 1990, now abandoned, which in turn is a continuation of Ser. No. 252,062 filed Sep. 30, 1988, now abandoned, which in turn is a continuation-in-part application of Ser. No. 236,327 filed Aug. 22, 1988, now U.S. Pat. No. 4,901,093 issued Feb. 13, 1990, which in turn is a continuation application of Ser. No. 89,020 filed Aug. 24, 1987, now abandoned, which in turn is a continuation application of Ser. No. 801,926 filed Nov. 26, 1985, now abandoned.

CROSS-REFERENCE TO RELATED APPLICATIONS

This application is related to U.S. Ser. No. 801,925, filed Nov. 26, 1985 (now U.S. Pat. No. 4,714,934) in the name of Robert L. Rogers, entitled "Apparatus for Printing With Ink Jet Chambers Utilizing a Plurality of Orifices", assigned to the assignee of the present invention and incorporated herein by reference.

BACKGROUND OF THE INVENTION

This invention is related generally to impulse or drop-on-demand ink jet printers, and more particularly to such ink jet printers which are capable of printing bar codes.

The "965 printer" which has been marketed by Exxon Office Systems, a predecessor in interest to the assignee of the present invention, employs a plurality of chambers, with a single orifice for each chamber, and a single transducer for ejecting a droplet of ink from the single orifice of each chamber. In that printer, the orifices are slanted or inclined with respect to the scanning direction so as to provide a desired field height while, at the same time, maintaining a desired resolution. Further details relating to the 965 printer are disclosed in U.S. Pat. No. 4,567,570, which is assigned to the assignee of the present invention, and incorporated herein by reference.

U.S. Pat. No. 4,714,934, referred to above, describes an impulse ink jet apparatus comprising a plurality of side-by-side chambers extending along a line slanted with respect to the direction of scanning. Each of the chambers includes a plurality of orifices (preferably three orifices per chamber) arranged along a line extending substantially transverse to the scanning direction, and means for ejecting a plurality of droplets from the orifices of each of the chambers. In accordance with a preferred embodiment of the invention, an overall field of droplets (i.e., three droplets) ejected from each of the plurality of orifices prints a segment of a bar, and the overall field of droplets ejected from each of the other plurality of orifices prints a different segment of the bar. This feature, the patent teaches, permits a sufficient degree of vertical and horizontal resolution in order to achieve both bar code and alphanumeric printing.

One problem with the immediately above-described method and apparatus, it has been discovered through subsequent testing, is that the three ink droplets ejected from each of the plurality of orifices converge while in flight, thus creating a single large droplet which is unacceptable for printing bar codes. It has also been discovered that such convergence is not only a function of the distance between the orifices and a recording medium, but is also a factor which contributes to pixels having a smaller than desired height. Such smaller pixels result in gaps formed between the bar code segments which, in turn, result in an unacceptable bar code character. It would, therefore, be desirable to provide an improved bar code printer which does not produce bar code segments with gaps formed there between.

SUMMARY OF THE INVENTION

Accordingly, it is a general object of the present invention to provide an impulse or drop-on-demand ink jet printer having a high degree of resolution and field height. More specifically, it is an object of the present invention to provide an impulse or drop-on-demand ink jet printer which is capable of printing bar code/alphanumeric information.

Another object of the present invention is to provide an impulse or drop-on-demand ink jet printer which is capable of printing bar code information without leaving gaps between the plurality of bar code segments forming such bar code information.

Briefly, these and other objects according to the present invention are accomplished by an impulse ink jet apparatus comprising a plurality of side-by-side chambers extending along a line slanted with respect to the direction of scanning. Each of the chambers include a plurality of orifices arranged along a line extending substantially transverse to the scanning direction and means for ejecting a plurality of droplets from the orifices of each chamber. In accordance with one important aspect of the present invention, the orifices are formed upon an orifice plate such that the distance between the centers of adjacent orifices associated with a single chamber are separated by a predetermined distance greater than the center distance required for drop placement on a recording medium such that the overall field of dots formed by droplets ejected from each of the plurality of grouped orifices prints one pixel of a bar without a gap with the overall field of dots formed by droplets ejected form another plurality of grouped orifices which print an adjacent pixel of the bar.

Other objects, advantages and novel features according to the present invention will become more apparent from the following detailed description of a preferred embodiment when considered in conjunction with the accompanying drawings wherein:

BRIEF DESCRIPTION OF THE DRAWINGS

FIG. 1 is a perspective view of the system depicting the invention incorporated in a bar code printer;

FIG. 2 is a plan view of an orifice plate of the system shown in FIG. 1;

FIG. 3 is a fragmentary view of the fragment 3 shown in FIG. 2;

FIG. 4 is a front view of the imaging head for the system shown in FIG. 1;

FIG. 5 is a sectional view taken along the line 5—5 of FIG. 1;

FIG. 6 is a sectional view of three channels of the system shown in FIGS. 1-5 taken along the line 6—6 of FIG. 5;

FIG. 7 is a fragmentary view of the fragment 7 shown in FIG. 5;

DETAILED DESCRIPTION OF A PREFERRED EMBODIMENT

Figure 8:
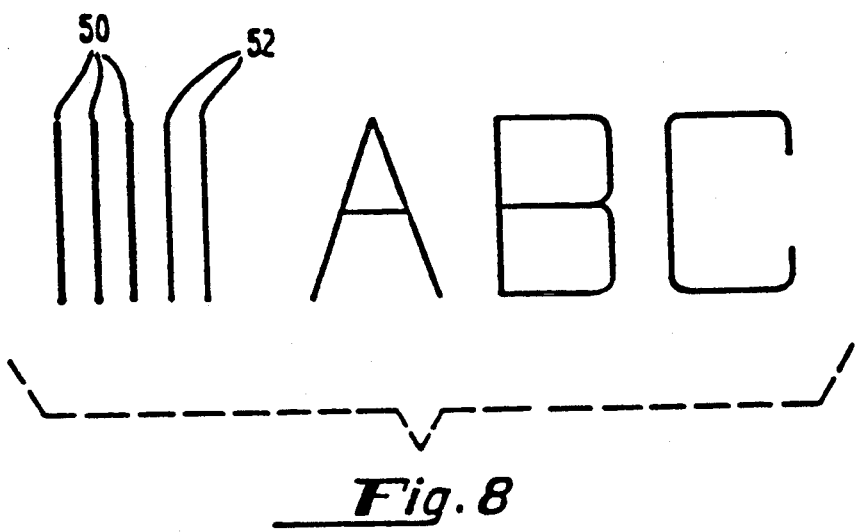
FIG. 8 is a bar code in combination with alphanumeric characters which can be printed with the apparatus shown in FIGS. 1-7.

Referring now to the drawings, wherein like characters designate like or corresponding parts throughout the several views, there is shown in FIG. 1 a print head 10 which includes a reservoir 12 and an imaging head 14. The print head 10 is juxtaposed to a target recording medium in the form of paper 16 which is advanced by means of a transport system, including rollers 18 and 20, in an incremental fashion. As is also shown in FIG. 1, the print head 10 includes an orifice plate 22 having orifices 24 formed therein. The orifices 24 of FIG. 1 are shown further apart from each other than they are in practice for purposes of illustration.

As in U.S. Pat. No. 4,714,934, the orifices 24 actually comprise a plurality of sets of orifices which will be more fully described with reference to FIGS. 2 and 3. The sets of orifices 24 are also vertically displaced in accordance with the above referenced U.S. Pat. No. 4,714,934 as a result of the inclination of the print head 10 with respect to the scanning direction depicted by the arrow 26.

As shown in FIGS. 2 and 3, the orifices 24 are arranged in groups of three (3) and inclined on the orifice plate 22 so as to be substantially vertical when the print head 10 is inclined with respect to the scanning direction 26 (FIG. 1). The hash marks 28 on the orifice plate 22 actually show this angle of inclination. The angle of the orifices 24 in each group with respect to the vertical as shown in FIG. 2 is chosen such that, when the orifice plate 22 is inclined in the manner shown in FIG. 4, the groups of orifices 24 are arranged along a line which will be vertical and extend substantially transverse to or at right angles to the scanning direction. Moreover, scanning in a direction depicted by the arrow 26 will not result in the overlap of any droplets projected from the orifice when the droplets are ejected sequentially so as to form a vertical bar. The angle "A" of inclination for the chamber line of the orifice plate 22 to achieve this vertical disposition of the orifices 24 exceeds ten degrees and preferably exceeds fifteen degrees. The particular slope is determined by the number of orifices, the inter-orifice spacing, the inter-chamber spacing and, the spatial resolution along the direction of travel. As is also shown in FIG. 4, a manifold 28 which will now be described with reference to FIG. 5 is provided behind the orifice plate 22.

As is shown in FIG. 5, the orifice plate 22 is secured to a chamber plate 30 having a plurality of side-by-side chambers 32 formed therein which extend along a line that is slanted with respect to the direction of scanning, each of the chambers including a plurality of the grouped orifices 24. Ink within the manifold 28 communicates with the chamber 32 through a restricted passageway 36 provided by a restrictor plate 38. A foot body member 40, located behind the restrictor plate 38, includes an opening 42 which receives an elongated transducer 44 terminated with a foot 46 which is in direct communication with the rear of the chamber 32.

As shown in FIGS. 5 and 6, the transducers 44 are elongated and flat. Such transducers 44 are expanded and then contracted along their axis of elongation so as to contract and expand the volume of the chamber 32 through its associated foot 46 by virtue of the application of a voltage across the planar surfaces of the transducers 44. It will be appreciated that the feet 46 may be secured to the foot body member 40 by means of a resilient, rubber-like material, such as silicone, which is marketed under the name RTV. The ends of the transducers 44 may be cemented to the feet 46 by means of a suitable adhesive such as, for example, an epoxy.

Referring now to FIG. 7, it can be seen that the individual orifices 24 are coupled to the chamber 32, as shown in detail. It will be noted that the orifices 24 closest to the rearwardly extending chamber walls 34 are spaced a distance therefrom equal to at least half the spacing between the orifices 24. Such an arrangement is necessary so as to assure that droplets ejected from the orifices 24 are ejected with a substantially uniform velocity.

Figure 9:
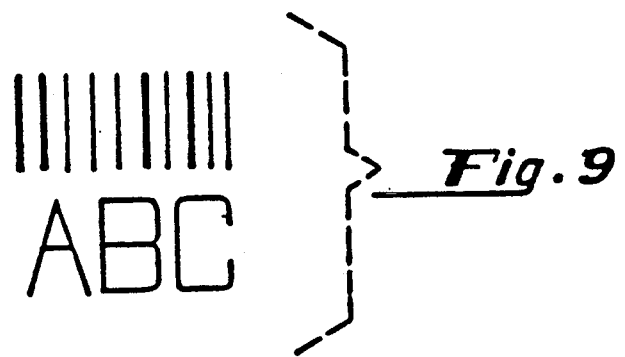
FIG. 9 is another bar code with alphanumeric characters which can also be printed utilizing the system of FIGS. 1-7.

Referring now to FIGS. 8 and 9, the type of printing achievable with the apparatus shown in FIGS. 1-7 is illustrated. At the lefthandmost extremity of FIG. 8, there is depicted a bar code wherein the width of the bars is modulated so as to produce wide bars 50 and narrow bars 52. Also depicted in FIG. 8 are alphanumeric characters "A", "B" and "C". As in U.S. Pat. No. 4,714,934, the number of orifices 24 in each of the chambers 32 is chosen vis-a-vis the number of chambers 32 so as to permit a sufficient degree of vertical and horizontal resolution to achieve both bar code and alphanumeric printing. In other words, the number of channels or chambers 32 is substantially more than the number of orifices 24 per channel or chamber 32. As shown in FIGS. 4 and 7, the total number of channels or chambers 32 is thirty-two (32), whereas the total number of orifices 24 per chamber is only three (3).

In FIG. 9, bar coding as well as alphanumeric printing is achieved utilizing the apparatus of FIGS. 1-7. In the case of FIG. 9, bar coding, including variable width bars 54, is located above the alphanumeric characters. In order to achieve the results shown in FIG. 9, certain channels or chambers may be dedicated to alphanumeric printing while other channels or chambers are dedicated to bar code printing. Here again, the number of orifices per chamber or channel vis-a-vis the number of channels is important to achieve the combination of information shown in FIG. 9.

As taught herein, a particular combination of orifices and chambers has been chosen to achieve a particular result. Bar code printing, in general, requires bars of from 0.125 inches to one (1) inch high and a minimum width of about 0.007 inches, with good control of edges, width and gaps between bars. By utilizing three (3) orifices per channel or chamber, and a total of thirty-two (32) channels or chambers, the necessary degree of accuracy may be achieved, including sufficient vertical resolution to permit alphanumeric printing while also permitting bars of about 0.500 inches high to be printed in a single pass. In this connection, it will be appreciated that each vertical bar, or bar code segment, which results from the ejection of droplets from the orifices of a single channel or chamber is only about 0.018 inches high. At the same time, other combinations of orifices and channels or chambers may also be utilized in accordance with the teachings of U.S. Pat. No. 4,901,093, and U.S. Pat. No. 4,714,934. For example, it is possible to utilize three (3) to fourteen (14), neighboring or grouped preferably three (3) to six (6), and even more preferably three (3) to four (4) orifices per channel or chamber. It is also possible to utilize more channels to achieve greater field height with a single pass of the print head 10 as shown in FIG. 1.

Figure 10:
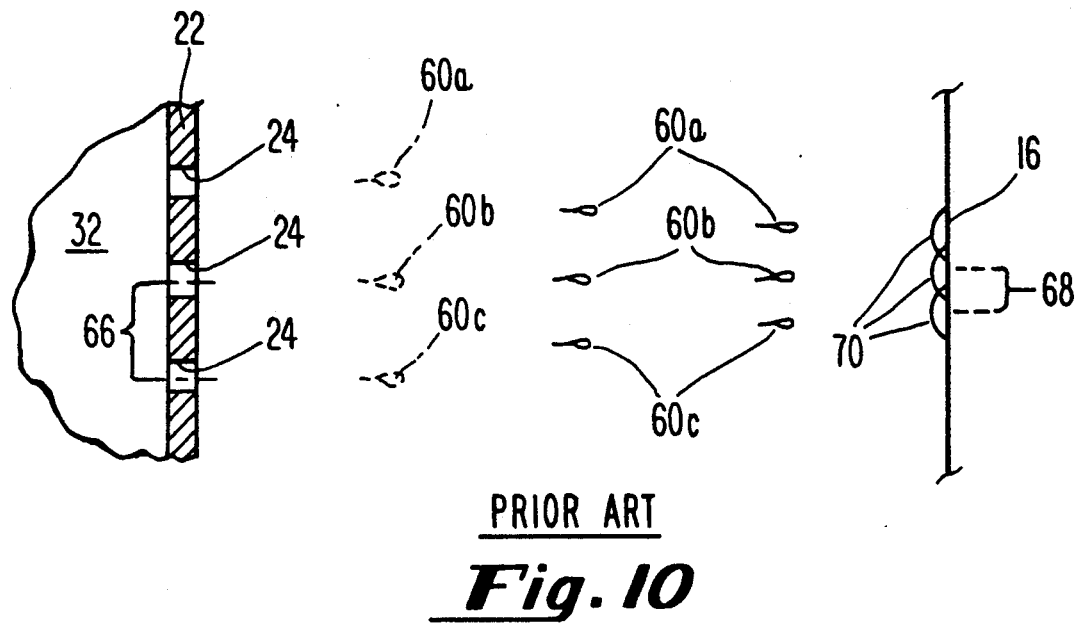
FIG. 10 illustrates the problem of droplet convergence caused by aerodynamic effects experienced in the apparatus of FIGS. 1-7.

It has subsequently been discovered that the three droplets which are ejected from a single channel or chamber of the apparatus shown in FIGS. 1-7 converge while in flight therefrom towards the recording medium. As shown in FIG. 10, the droplets 60a, 60b and 60c issuing from a set of orifices 24 spaced by a center-to-center distance 66 corresponding to a single channel or chamber 32 are initially ejected at substantially uniform speeds. However, drag forces and other aerodynamic effects cause the droplets 60a, 60b and 60c ejected from neighboring or groups of orifices to converge towards the trajectory of the centermost droplet 60b, thereby causing a severe overlapping thereof as shown in FIG. 11 with a center-to-center spacing 68 of dots 70 and ultimately producing a pixel of reduced height.

Figure 11:
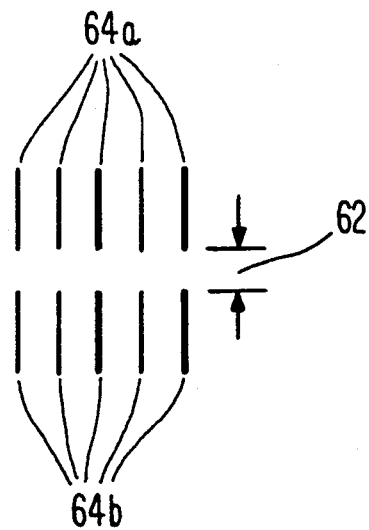
FIG. 11 is a bar code printed with the converging droplets illustrated in FIG. 10.

As is also shown in FIG. 11, such overlapping of the converged droplets 60a, 60b and 60c from one channel or chamber, and a similar overlapping of the converged droplets 60a', 60b' and 60c' from another channel or chamber, leads to the formation of a gap 62 between the bar code segments 64a and 64b printed respectively by the droplets 60a, 60b and 60c, and 60a', 60b' and 60c'.

While it has also been found that the above described convergence is a function of the distance between the orifice plate 22 and the recording medium 16 (FIG. 1), correction of the convergence by varying the distance between the orifice plate 22 and the recording medium 16 would be undesirable because of its impact upon such other desirable printing characteristics as print quality That is, a decreasing of the distance between the orifice plate 22 and the recording medium 16 has been shown to increase the pixel height. Any such increase in the pixel height, however, does not occur until the distance between the orifice plate 22 and the recording medium 16 is so small that the recording medium 16 cannot be reliably moved past the orifice plate 22 without contacting it.

Alternatively, one may correct for the above described convergence problem without affecting other more desirable printing characteristics by increasing the distance between the centers 66 (FIG. 10) of the orifices 24 associated with a single chamber 32. That is, in order to produce a suitable bar code segment with a minimum width of 0.007 inches, apparatus as shown in FIGS. 1-7 must be typically adapted to jet dots upon the recording medium with about 0.0052 inches between their centers. However, in order to avoid the problems associated with convergence of the droplets from their orifices, while at the same time providing the capability to print bar code segments with a minimum width of 0.007 inches, the orifice plate 22 formed according to the present invention will include a plurality of sets of orifices 24, each orifice 24 of a particular set or group being separated from its associated neighboring or grouped orifices 24 by a predetermined center-to-center distance between neighboring or grouped orifices 24 greater than between center-to-center distance the dots formed upon the recording medium such that the overall field of dots formed by droplets ejected from each of the plurality of grouped orifices prints one pixel of a bar without a gap with the overall field of dots formed by droplets ejected form another plurality of grouped orifices which print an adjacent pixel of the bar such that the overall field of dots formed by droplets ejected from each of the plurality of grouped orifices prints one pixel of a bar without a gap with the overall field of dots formed by droplets ejected from another plurality of grouped orifices which print an adjacent pixel of the bar.

Figure 12:
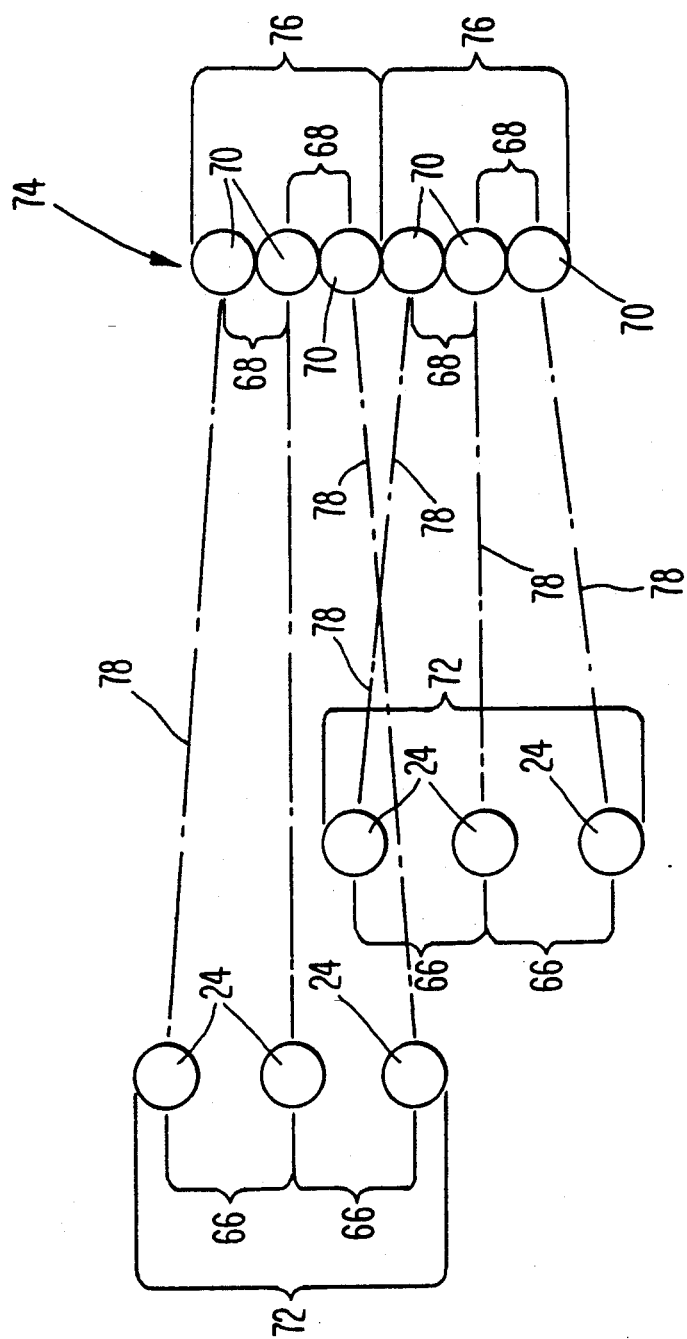
FIG. 12 is a schematic diagram representing the printing of a bar code using the invention.

Reference will now be made to FIG. 12 for a discussion of the relationship between orifices 24 vis-a-vis droplets producing dots forming pixels in a bar code in accordance with this invention. It will however be understood that FIG. 12 is highly schematic in its representation of orifices and dots forming pixels of the bar code. As shown in FIG. 12, orifices 24 of two groups 72 have a predetermined center-to-center distance or spacing 66 which is greater than the center-to-center distance or spacing 68 between dots 70 in a segment 74 of a bar code such that the overall field of dots 70 formed by droplets ejected from each of the plurality of orifices 24 in one group 72 prints one pixel 76 of a bar without a gap between pixels 76. The line 78 extending between the orifices 24 and the dots 70 depict the flight paths of the droplets of ink which form the dots 70 as the droplets of ink from a group of orifices 24 converge to form single pixel 76.

Obviously, many modifications and variations are possible in light of the above teachings. It is to be understood, therefore, that within the scope of the appended claims, the present invention may be practiced otherwise than as specifically described herein.

What I claim is:

1. In scanning impulse ink jet apparatus for printing bars in a bar code on a recording medium, the apparatus including a plurality of side-by-side chambers that extend along a line that is slanted with respect to the direction of scanning, each of the chambers including a plurality of grouped orifices that area arrayed along a line which extends at a right angle to the scanning direction, and means, including a plurality of transducers, for ejecting a plurality of droplets from the grouped orifices of each chamber to form dots on the recording medium, wherein a plurality of the dots overlap to form a pixel of a known height, one of the transducers being coupled to each of the chambers, a method of compensating for aerodynamic effects on the droplets ejected from the plurality of orifices for each of the chambers comprising the steps of:

selecting a center-to-center distance between the dots forming a single pixel;
  spacing apart each orifice in the plurality of orifices for each of the chambers form the adjacent orifices in its respective plurality of grouped orifices a predetermined center-to-center distance that is greater than said center-to-center distance between the dots formed on the recording medium by said adjacent orifices such that the overall field of dots formed by droplets ejected from each of the plurality of grouped orifices prints one pixel of a bar without a gap with the overall field of dots formed by droplets ejected from another plurality of grouped orifices which print an adjacent pixel of the bar.

2. In scanning ink jet apparatus for printing bars in a bar code on a recording medium, the apparatus include a plurality of side-by-side chambers that extend along a line that is slanted with respect to the direction of scanning, each of the chambers including a plurality of grouped orifices that are arrayed along a line which extends at a right angle to the scanning direction, and means, including a plurality of transducers, for ejecting a plurality of droplets from the orifices of each chamber to form dots on the recording medium, one of the transducers being coupled to each of the chambers, the improvement wherein each said orifice in the plurality of grouped orifices for each of the chambers is spaced apart from the adjacent orifices in its respective plurality of grouped orifices a predetermined center-to-center distance that is greater than the center-to-center distance between the dots formed on the recording medium by said adjacent orifices such that the overall field of dots formed by droplets ejected from each of the plurality of group orifices of one chamber prints one pixel of a bar without a gap with the overall field of dots formed by droplets ejected from another plurality of grouped orifices of another chamber which print an adjacent pixel of the bar.

3. The ink jet apparatus of claim 2, wherein the overall field of droplets comprises the field of the plurality of droplets for one chamber multiplied by the number of chambers.

4. The impulse ink jet apparatus of claim 2, wherein said chamber line is slanted at an angle in excess of ten degrees (10°).

5. The impulse ink jet apparatus of claim 2, wherein said chamber or chamber line is slanted at an angle in excess of fifteen degrees (15°).

6. The impulse ink jet apparatus of claim 2, wherein the number of chambers exceeds the number of orifices per chamber.

7. The impulse ink jet apparatus of claim 2, wherein said chambers are substantially circular in cross-section.

8. The impulse ink jet apparatus of claim 2, wherein each of said transducers is elongated and adapted to expand and to contract along the axis of elongation so as to eject droplets.

9. Ink jet apparatus comprising:
a recording medium; and
a scanning print head for printing bars in a bar code on said recording medium, said print heat with respect to a direction of scan being displaced substantially perpendicular from said recording medium, said print head including:
a plurality of side-by-side chambers that extend along a line that is slanted with respect to said direction of scanning, each said chamber including a plurality of orifices arranged along a line extending along a line extending at a right angle to said direction of scan; and
means, including a plurality of transducers, for ejecting a plurality of droplets from said orifices of each chamber to form dots on said recording medium, one said transducer being coupled to each said chamber;
wherein each said orifice in said plurality of grouped orifices for each said chamber is spaced apart from the adjacent orifices in its respective plurality of grouped orifices a predetermined center-to-center distance that is greater than the center-to-center distance between the dots formed on the recording medium by said adjacent orifices such that the overall field of dots formed by droplets ejected from each of the plurality of grouped orifices prints one pixel of a bar without a gap with the overall field of dots formed by droplets ejected from another plurality of grouped orifices which print an adjacent pixel of the bar.

* * * * *

UNITED STATES PATENT AND TRADEMARK OFFICE
CERTIFICATE OF CORRECTION

PATENT NO. : 5,258,774
DATED : November 2, 1993
INVENTOR(S) : Robert L. Rogers

It is certified that error appears in the above-indentified patent and that said Letters Patent is hereby corrected as shown below:

Column 5, Line 22, delete "ejected from neighboring or groups of orifices".

Column 5, Line 68, delete between neighboring or grouped orifices 24".

Column 6, Line 1, after "distance" delete "the" and replace with --between--.

Column 6, Lines 7, after "bar" delete "such that".

Column 6, Lines 8 through 13, delete in their entirety.

Signed and Sealed this

Seventh Day of November, 1995

*Attest:*

BRUCE LEHMAN

*Attesting Officer*   Commissioner of Patents and Trademarks